United States Patent
Miyata

(10) Patent No.: US 7,273,226 B2
(45) Date of Patent: *Sep. 25, 2007

(54) AIR BAG DEVICE AND MOTORBIKE WITH AIR BAG DEVICE

(75) Inventor: Yasuhito Miyata, Shiga (JP)

(73) Assignee: Takata Corporation, Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 10/826,084

(22) Filed: Apr. 16, 2004

(65) Prior Publication Data

US 2004/0207185 A1    Oct. 21, 2004

(30) Foreign Application Priority Data

Apr. 17, 2003    (JP) .............................. 2003-112996

(51) Int. Cl.
*B60R 21/20*    (2006.01)

(52) U.S. Cl. ................. 280/730.1; 280/728.2; 280/728.3

(58) Field of Classification Search ............. 280/730.1, 280/728.3, 728.2, 728.1, 743.1
See application file for complete search history.

(56) References Cited

U.S. PATENT DOCUMENTS 5,938,231 A    8/1999    Yamazaki 6,099,028 A *    8/2000    Seifert ...................... 280/728.3
6,846,009 B2    1/2005    Kuroe et al.
2004/0207182 A1*    10/2004    Miyata .................... 280/730.1
2004/0251664 A1*    12/2004    Miyata .................... 280/730.1

FOREIGN PATENT DOCUMENTS

| DE | 101 06 437 A1 | 8/2002 |
| JP | 2000-108974 | 4/2000 |
| JP | 2002-137777 | 5/2002 |

* cited by examiner

*Primary Examiner*—Eric Culbreth
(74) *Attorney, Agent, or Firm*—Fitch, Even, Tabin & Flannery

(57) ABSTRACT

A construction technology for an air bag which contributes to adequate protection of the driver in an accident, and related technologies are provided. A two-wheeled motor vehicle serving as a motorbike is equipped with an air bag device including an air bag for deploying and inflating in a driver-protection area formed on the front side of the driver in the event of a frontal collision and a retainer capable of storing this air bag. With respect to the air bag, a part of this air bag is disposed outside the retainer, and this disposition portion is mounted along the long-length direction (longitudinal direction) of a handlebar.

20 Claims, 6 Drawing Sheets

AIR BAG DEVICE AND MOTORBIKE WITH AIR BAG DEVICE

FIELD OF THE INVENTION

The present invention relates to a construction technology for an air bag device mounted on a motorbike.

BACKGROUND OF THE INVENTION

There are various known technologies for protecting drivers by mounting air bag devices on a motorbike. For example, a technology is known in which an air bag stored in a case mounted on a vehicle body frame is allowed to deploy and inflate by an expanding gas in the event of a frontal collision and, thereby, the driver is restrained (for example, refer to Japanese Unexamined Patent Application Publication No. 2002-137777). This technology allows the possibility of ensuring a large protection area provided by the air bag. However, in the case where an air bag device is mounted on a vehicle body, such as a motorbike, and is configured to open in all directions, the establishment of a technology further effective for reliably restraining the driver with the air bag is highly demanded.

SUMMARY OF THE INVENTION

The present invention was made in consideration of the above-described points. Accordingly, the object of the present invention is to provide a construction technology for an air bag which contributes to adequate protection of the driver in an accident, and to related technologies.

In order to achieve the above-described object, the invention has been constructed according to several forms. The invention according to each of these forms can be applied to configurations of air bag devices mounted on various types of motorbikes. In the present specification, the term "motorbike" includes saddle-type vehicles in a broad sense, that is, vehicles of the type in which a driver sits astride a seat. Examples thereof include both a two-wheeled motor vehicle of the type in which a fuel tank is also installed forward of the driver's seat and a two-wheeled motor vehicle of the scooter-type in which a space is provided between the driver's seat and a head pipe for supporting the handlebar. The above-described "motorbike" broadly includes vehicles which have at least three wheels and in which the driver sits astride a seat (for example, a three-wheeled motorbike used for delivering pizzas and a three-wheeled or four-wheeled buggy-type motorbike for travelling on roads in bad conditions), and furthermore, vehicles, such as snowmobiles, which maneuver with the aid of a sled or pedrail and in which the driver sits astride a seat, in addition to two-wheeled motor vehicles.

In the invention according to a first form an air bag device mounted on a motorbike is provided with an air bag and a holder.

The air bag of the present invention is supplied with an expanding gas in the inside thereof in the event of a frontal collision of the motorbike. The holder has a configuration capable of storing the air bag. In a typically adopted configuration, the above-described air bag and a device, e.g., an inflator, for inflating the air bag, are stored in a retainer serving as the holder, and the expanding gas is supplied to the inside of the air bag by operation of the inflator. In this manner, the air bag deploys and inflates while protruding toward a driver-protection area formed at the front side of the driver.

The air bag of the present invention has a configuration in which at least a part thereof is disposed outside the holder. The disposition configuration of this disposition portion may also be realized by deploying (drawing) at least a part of the air bag from the holder in the air bag device mounted in the condition in which the entire air bag is stored in the holder, or be realized by mounting the air bag device beforehand in order that at least a part of the air bag is disposed outside the holder.

The term "vehicle body-side component" in the present invention refers to various components directly or indirectly mounted on a vehicle body in a broad sense. Typical examples of vehicle body-side components include a handlebar, panel, and the like mounted on a vehicle body. Furthermore, components which become the vehicle body-side components after the air bag device is mounted on the body of a motorbike, for example, a component which originally constitutes a part of the air bag device and constitutes a part of a vehicle body after this air bag device is mounted on the body of a motorbike, are also included in the "vehicle body-side component" criteria in the present invention.

The term "mountable" in the present invention refers to the state in which mounting on a vehicle body-side component can eventually be accomplished, and broadly includes configurations in which the disposition portion of the air bag, disposed outside the holder, is mounted on the vehicle body-side component before mounting, during mounting, or after mounting of the air bag device. The timing of the mounting on the vehicle body-side component is not restricted.

Preferably, the disposition portion of the air bag, disposed outside the holder, is mounted on a vehicle body-side component, while being mounted in the location where protrusion of this disposition portion into a driver-protection area is permitted. A typical example of this mounting configuration includes a configuration in which the disposition portion disposed outside the holder is mounted on a vehicle body-side component opposite to (facing) the driver-protection area. According to the above-described mounting configuration, it is possible to avoid the air bag becoming caught on the projection and the like of the vehicle body-side component, thereby inhibiting deployment and inflation of the air bag. Consequently, adequate protection of the driver in an accident can be achieved.

According to this configuration of the present invention, since at least a part of the air bag is disposed outside the holder, the directivity of the protrusion of the air bag can be improved and, therefore, the direction of protrusion of the air bag is effectively controlled. That is, in the known configuration in which the entire air bag is stored in the holder, the folding form of the air bag and the like must be improved in order to protrude the air bag in a suitable protrusion direction. However, when the disposition portion of the air bag, disposed outside the holder, is disposed in the location facing the driver-protection area, the air bag can be stably, reliably protruded toward the driver-protection area.

When at least a part of the air bag is disposed outside the holder, as in the present invention, the time required to accomplish the deployment and inflation of the entire air bag can be reduced and the property of restraining the driver can be improved. Furthermore, the above-described configuration can miniaturize the holder. That is, in particular, with respect to the body of a motorbike wherein the driver is exposed in all directions, generally, the holder is upsized in order to reliably restrain the driver by using a larger holder. However, when at least a part of the air bag is disposed outside the holder, as in the present invention, the holder can be miniaturized while ensuring the property of restraining the driver. In this manner, the external appearance can be improved with respect to the motorbike equipped with the air bag device.

In the air bag device according to the first form, preferably, the air bag is mountable on a handlebar portion which is the vehicle body-side component, as in a second form. The term "handlebar portion" in the present invention refers to the handlebar itself, various components, e.g., a bracket, mounted on the handlebar, and those having a configuration in which these various components and the handlebar are combined. For example, a configuration in which at least a part of the air bag is indirectly mounted on the handlebar with a bracket or the like therebetween is included in the "mounted on the handlebar portion" criteria in the present invention, in addition to the configuration in which at least a part of the air bag is directly mounted on the handlebar.

In general, the motorbike has a configuration in which the handlebar portion is opposite to (facing) the driver-protection area formed on the front side of the driver. In such a configuration, when a disposition portion of the air bag, disposed outside the holder, is disposed at the handlebar portion facing the driver-protection area, the air bag can be stably, reliably protruded toward the driver-protection area. According to the above-described configuration of the present invention, the mounting location of the disposition portion disposed outside the holder is readily determined and, therefore, mountability is excellent.

Most of all, when this disposition portion is mounted on the handlebar portion with mounting hardware, e.g., rivets, bolts, and clips, shifting of the location of the air bag can be prevented by the mounting hardware during restraint of the driver with the air bag after completion of deployment and inflation. The handlebar portion having rigidity serves as a pressure-receiving portion of the air bag after completion of deployment and inflation and, thereby, a load applied from the driver to the air bag can be reliably received by the handlebar portion. In general, the handlebar portion of the motorbike may be disposed in the location where the deployment and inflation of the air bag tend to be hindered. However, the configuration in which the disposition portion disposed outside the holder is mounted on this handlebar portion itself can allow the deployment and inflation of the air bag to become unlikely to be hindered by the handlebar portion. In general, the handlebar portion has a long-length configuration. However, according to the configuration in which the disposition portion disposed outside the holder is mounted over a wide range along the longitudinal direction of this long-length handlebar portion, the directivity of the protrusion of the air bag can be improved and, therefore, the direction of protrusion of the air bag is effectively controlled.

In the configuration of the invention according to a third form, the disposition portion disposed outside the holder, as in the configuration of the air bag device according to the first or second forms, is covered with a covering component. Examples of components appropriately used as this covering component include a cloth or resin component covering the periphery of the air bag. The above-described covering component has the effect of maintaining the folding state of the folded air bag, the effect of protecting the air bag from the outside, and the like. When the air bag deploys and inflates, this covering component is broken or is pushed away, therefore permitting the deployment and inflation of the air bag. In this configuration, the deployment and inflation of the air bag are not hindered by the covering component.

The invention according to a fourth form is specified to a motorbike equipped with the air bag device according to any one of the previously described forms. This motorbike has a configuration in which at least a part of the air bag is mounted on the vehicle body-side component outside the holder. In this manner, it is possible to avoid the air bag becoming caught on the projection and the like of the vehicle body-side component, thereby inhibiting deployment and inflation of the air bag. Consequently, a motorbike capable of achieving adequate protection of the driver in an accident is provided.

DETAILED DESCRIPTION OF THE PREFERRED EMBODIMENTS

Figure 1:
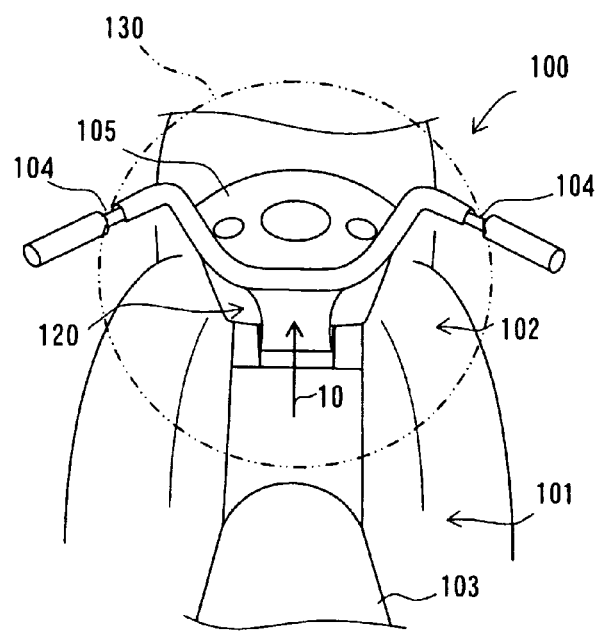
FIG. 1 is a diagram of the scooter-type two-wheeled motor vehicle 100 according to an embodiment of the present invention, viewed from the driver's side, and shows a state in which the air bag device 120 is mounted on the two-wheeled motor vehicle 100.
Figure 2:
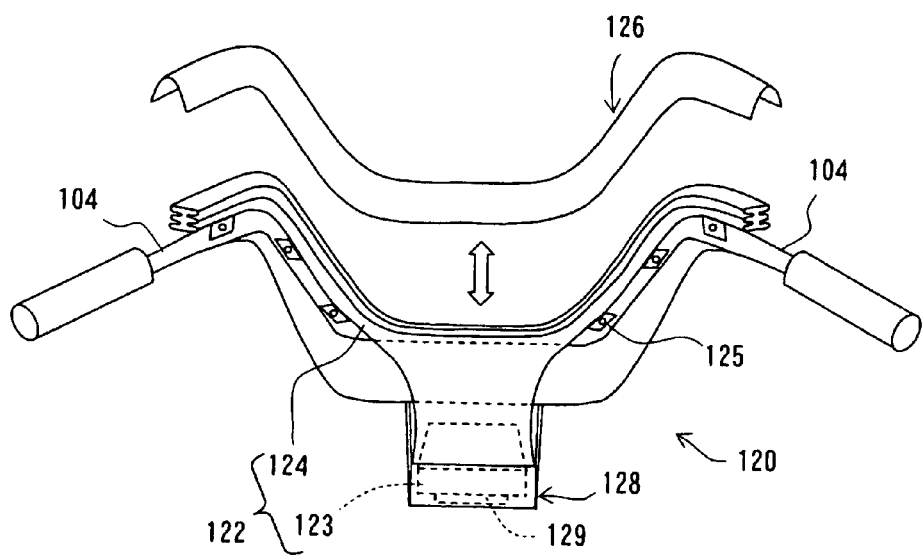
FIG. 2 is a diagram showing the configuration of the air bag device 120 shown in FIG. 1.
Figure 3:
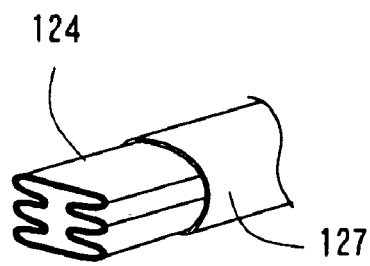
FIG. 3 is a magnified partial view of the diagram in FIG. 2.

An embodiment of the present invention will now be described below in detail with reference to the drawings. Here, FIG. 1 is a diagram of a scooter-type two-wheeled motor vehicle 100 according to an embodiment of the present invention, viewed from the driver's side, and shows a state in which an air bag device 120 is mounted on the two-wheeled motor vehicle 100. FIG. 2 is a diagram showing the configuration of the air bag device 120 shown in FIG. 1. FIG. 3 is a magnified partial diagram of FIG. 2. The two-wheeled motor vehicle 100 in the present embodiment corresponds to an example of the "motorbike" in the present invention.

As shown in FIG. 1, the two-wheeled motor vehicle 100 is configured as a scooter primarily including a vehicle body construction portion 101 composed of an engine, a main frame, and the like; a seat 103 which a driver can sit astride; a handlebar 104; and front and rear wheels (not shown in the drawing).

The area above the vehicle body construction portion 101 of the two-wheeled motor vehicle 100, to the front side of the driver, is defined as a driver-protection area 130 in the event of a frontal collision of the two-wheeled motor vehicle 100. In the present embodiment, the term "frontal collision" broadly includes a situation in which the two-wheeled motor vehicle 100 collides with another object (not specifically shown in the drawing for convenience). The term "driver-protection area 130" in the present embodiment is defined as a space which extends in the forward movement direction 10 in the case where the driver comes close to moving forward of the two-wheeled motor vehicle 100 due to the kinetic energy of the frontal collision, and in which the driver who comes close to being thrown forward of the two-wheeled motor vehicle 100 is restrained and protected.

For example, a handlebar 104, an air bag device 120, and a panel 105 including various meters, switches, and the like are disposed in the front portion 102 on the front side of the vehicle body in the vehicle body construction portion 101. In particular, the air bag device 120 is mounted on the handlebar 104, and is disposed so as to face the above-described driver-protection area 130. That is, in the present embodiment, the air bag device 120 is disposed in order that the protrusion (deployment and inflation) direction of the air bag 122 described below is directed toward the front side of the driver.

As shown in FIG. 2, the air bag device 120 is primarily composed of the air bag 122, a retainer 128 for storing this air bag 122, an inflator 129 for supplying an expanding gas in order that the air bag 122 deploys from the retainer 128 and inflates, mounting hardware 125, a cover 126, and the like. This retainer 128 corresponds to the "holder" in the present invention.

The air bag 122 in the present embodiment includes a first component portion 123 which is stored in the inside of the retainer 128, and a second component portion 124 which is disposed outside the retainer 128. The first component portion 123 is stored in the inside of the retainer 128 while being folded into the shape of, for example, a roll.

On the other hand, the second component portion 124 is mounted along the longitudinal direction of the long-length handlebar 104 outside the retainer 128 with mounting hardware 125 and the like. In the present embodiment, the second component portion 124, which is a part of the air bag 122, is disposed outside the retainer 128, and this second component portion 124 is mounted on the vehicle body-side component portion of the handlebar 104. That is, this second component portion 124 to be mounted on the handlebar 104 corresponds to the "disposition portion disposed outside the holder" in the present invention, and the handlebar 104 corresponds to the "vehicle body-side component" and the "handlebar portion" in the present invention. This second component portion 124 may be disposed by deployment (drawing) of a part of the air bag 122 from the retainer 128 while the entire air bag 122 is in the state of being stored in the retainer 128 followed by mounting. Alternatively, the second component portion 124 may be disposed outside the retainer 128 in advance and, thereafter, be mounted.

The second component portion 124 is mounted on the top face portion of the handlebar 104 with mounting hardware 125. Rivets, bolts, clips, and the like, as needed, can appropriately be used as the mounting hardware 125. The cover 126 has a configuration corresponding to the shape of the handlebar 104 equipped with the second component portion 124, and is configured to cover both the second component portion 124 and the handlebar 104. This cover 126 is provided with a tear line 126a. In this configuration, the cover 126 tears along this tear line 126a when the second component portion 124 deploys and inflates and, thereby, the deployment and inflation of the second component portion 124 are permitted. That is, this cover 126 protects the second component portion 124 from the outside and, in addition, permits the deployment and inflation of this second component portion 124.

In the preferable configuration, the second component portion 124 mounted along the handlebar 104 is folded beforehand into a predetermined shape, for example, the shape of a bellows, and the periphery thereof is covered with a protective cloth 127, as shown in FIG. 3. This protective cloth 127 has a configuration in which the state of the folded second component portion 124 can be maintained and, in addition, when the second component portion 124 deploys and inflates, the deployment and inflation of the second component portion 124 are permitted. For example, the protective cloth 127 can be constructed by using a material, e.g., a thin cloth, which is readily torn and, therefore, does not hinder the deployment and inflation of the second component portion 124. According to such a configuration, the folding of the second component portion 124 can be prevented from losing its shape, and the second component portion 124 smoothly deploys and inflates. This protective cloth 127 and the above-described cover 126 correspond to the "covering component" in the present invention.

Figure 4:
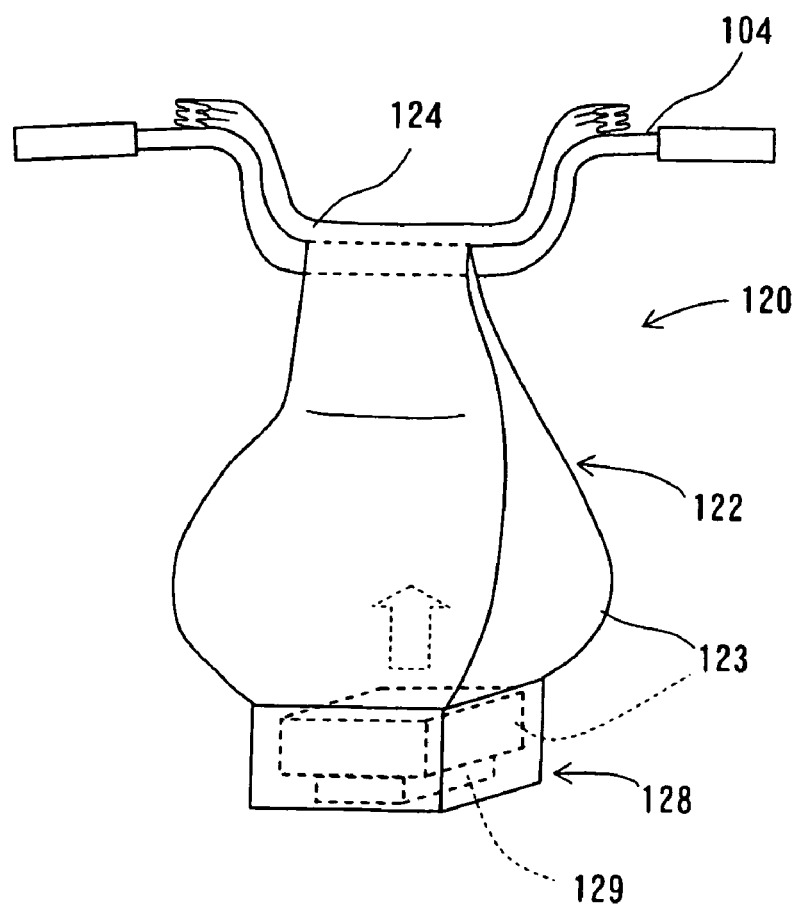
FIG. 4 is a diagram schematically showing the condition of an initial stage of deployment of the air bag device 120.
Figure 5:
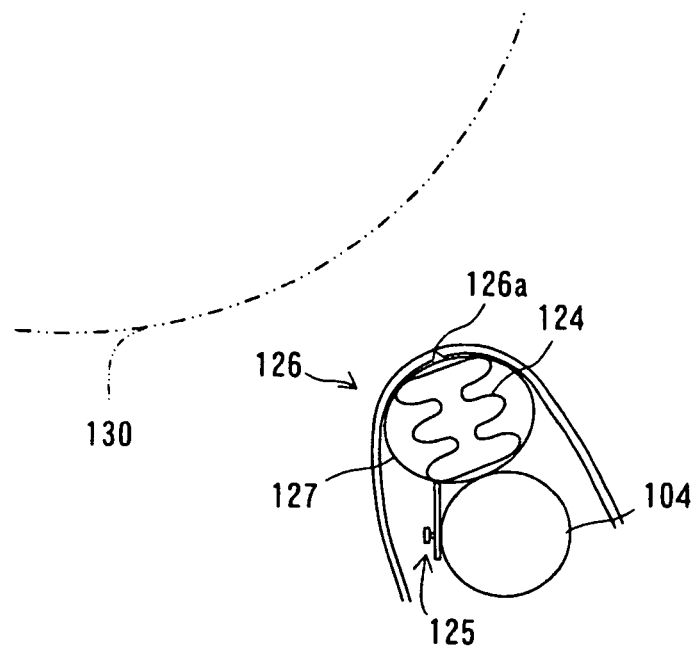
FIG. 5 is a partial sectional view of FIG. 4.
Figure 6:
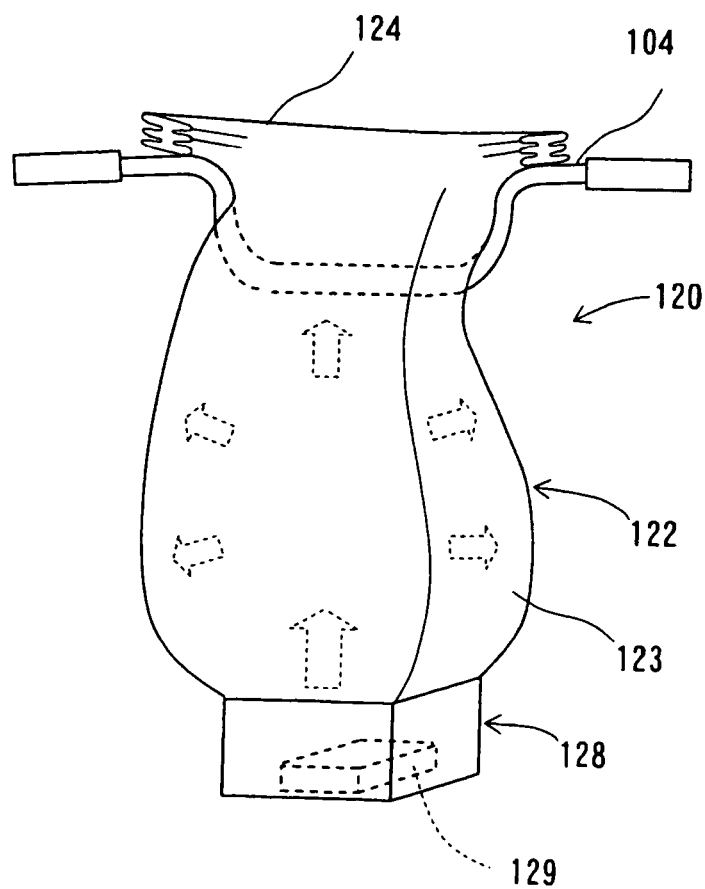
FIG. 6 is a diagram schematically showing the condition during deployment of the air bag device 120.
Figure 7:
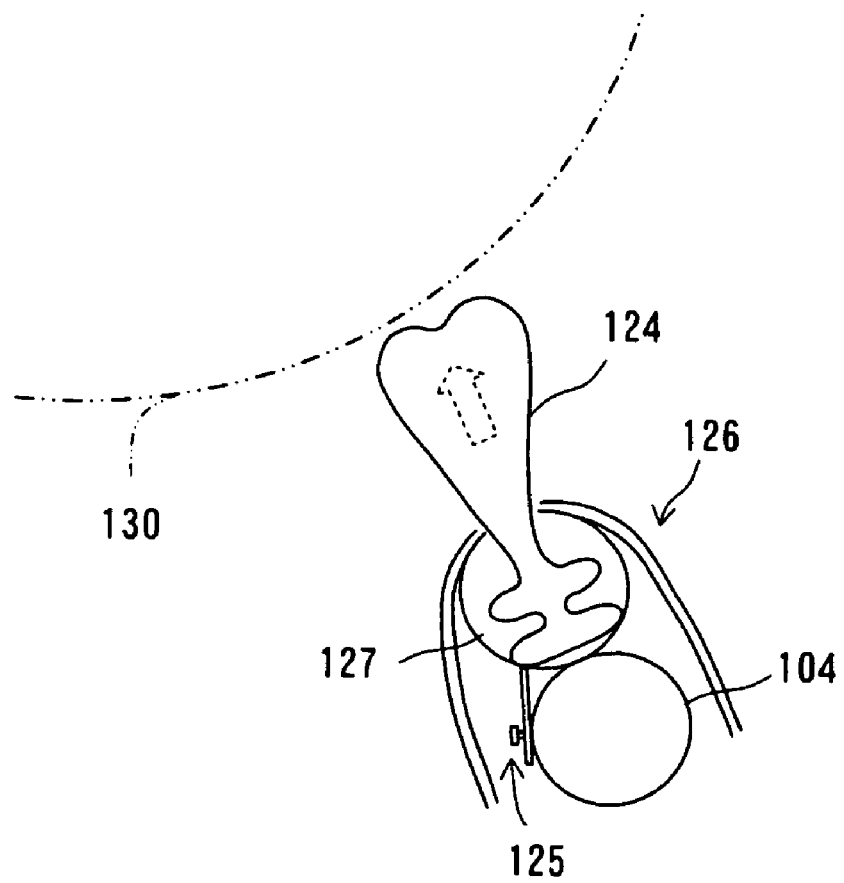
FIG. 7 is a partial sectional view of FIG. 6.
Figure 8:
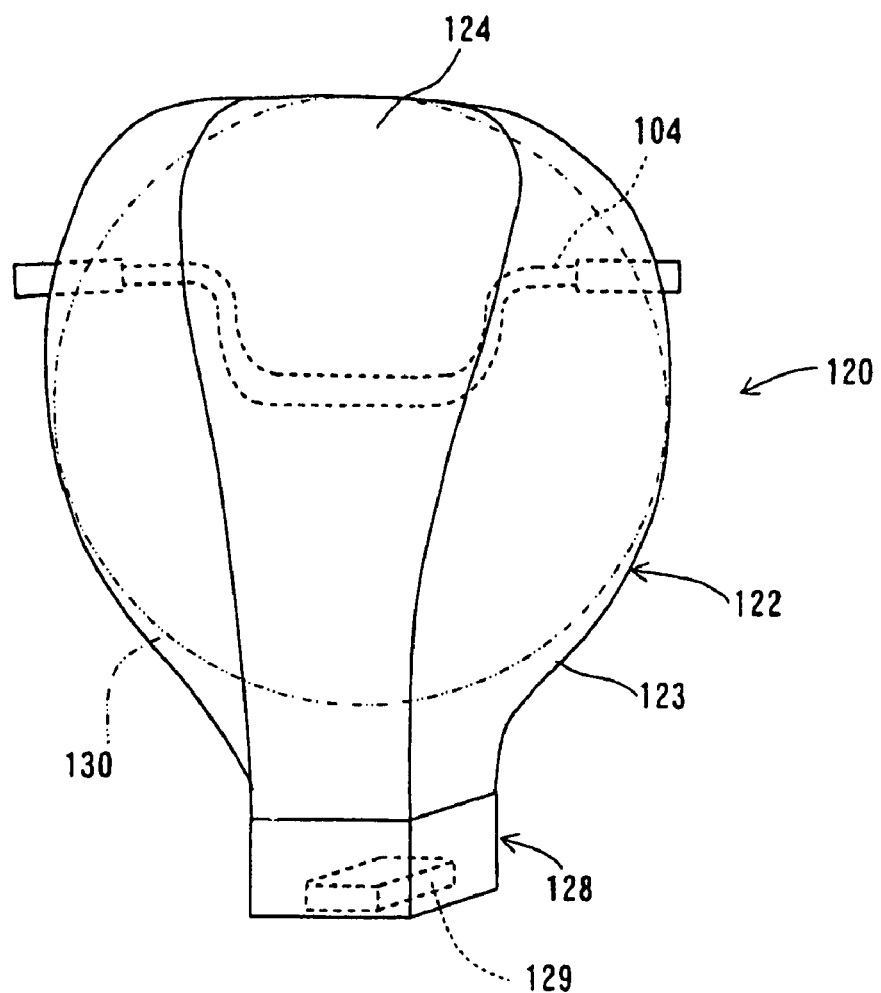
FIG. 8 is a diagram schematically showing the condition just after completion of deployment of the air bag device 120.

The operations of the two-wheeled motor vehicle 100 and the air bag device 120, which are configured and installed as described above, will be described below with reference to FIG. 4 to FIG. 8, in addition to FIG. 1 to FIG. 3. Here, FIG. 4 is a diagram schematically showing the condition of an initial stage of deployment of the air bag device 120. FIG. 5 is a partial sectional view of FIG. 4. FIG. 6 is a diagram schematically showing the condition during deployment of the air bag device 120. FIG. 7 is a partial sectional view of FIG. 6. FIG. 8 is a diagram schematically showing the condition just after completion of deployment of the air bag device 120.

In the event of a collision of a two-wheeled motor vehicle 100 in the traveling direction side, the driver comes close to moving (being thrown) forward of the two-wheeled motor vehicle 100 (in the direction indicated by an arrow 10 shown in FIG. 1). In the present embodiment, the air bag device 120 is operated based on the detection of a frontal collision, and protrusion (deployment) of the air bag 122 from the air bag device 120 toward the driver-protection area 130 is started. The inflator 129, serving as an expanding gas supply device, starts to supply the expanding gas into the air bag 122 and, thereby, deployment and inflation of the air bag 122 are started. Here, the condition of an initial stage of the deployment of the air bag device 120 is shown in, for example, FIG. 4 and FIG. 5.

As shown in FIG. 4, in the initial stage of the deployment of the air bag device 120, the first component portion 123 of the air bag 122 deploys and inflates while bursting out of the retainer 128. The situation in which the air bag 122 inflates while deploying, as described above, corresponds to "deployment and inflation" in the present invention. In this condition, the second component portion 124 disposed along the handlebar 104 is maintained in the condition of being covered with the protective cloth 127 and being stored in the cover 126, as shown in FIG. 5, for example.

The supply of the expanding gas to the air bag 122 is further continued. The condition in which the deployment and inflation of the air bag 122 are in an advanced stage is shown in FIG. 6 and FIG. 7, for example.

As shown in FIG. 6, during the deployment of the air bag device 120, the deployment and inflation of the first component portion 123 of the air bag 122 are further advanced and, therefore, the inflation area is enlarged, while the deployment and inflation of the second component portion 124 are started. In this condition, the second component portion 124 mounted on the handlebar 104 inflates as shown in FIG. 7, for example. At this time, the protective cloth 127 is torn by the inflation force of the second component portion 124, the cover 126 is torn by the inflation force of the second component portion 124 and, therefore, the second component portion 124 protrudes toward the driver-protection area 130.

In this manner, when the deployment of the air bag device is completed, the entire air bag 122 composed of the first component portion 123 and the second component portion 124 deploys and inflates in the driver-protection area 130, as shown in FIG. 8, for example. In this condition in which the air bag 122 has completely deployed and inflated, the inflated air bag 122 occupies the driver-protection area 130. Consequently, a driver who comes close to moving forward of the vehicle body (in the direction indicated by an arrow 10 shown in FIG. 1) due to the kinetic energy in the collision is reliably held and restrained in the driver-protection area 130, and is prevented from being thrown forward of the two-wheeled motor vehicle 100.

As described above, according to the air bag device 120 in the present embodiment, since the second component portion 124 is mounted on the handlebar 104, the deployment and inflation of the air bag 122 become unlikely to be hindered by the air bag 122 being caught on the projection of the handlebar 104 and the like. In general, the handlebar of the motorbike may be disposed in such a location where the deployment and inflation of the air bag are readily hindered. However, the present embodiment, in which the second component portion 124 is mounted on the handlebar 104 itself, is particularly effective at allowing the deployment and inflation of the air bag 122 to become unlikely to be hindered by the handlebar 104. Consequently, adequate protection of the driver in an accident can be achieved.

The above-described configuration of the air bag device 120 in the present embodiment can improve the directivity of, particularly, the protrusion of the second component portion 124 of the air bag 122 and, therefore, the direction of protrusion of the air bag 122 is effectively controlled. That is, in the known configuration in which the entire air bag is stored in the holder (retainer), the folding form of the air bag and the like must be improved in order to protrude the air bag in a suitable protrusion direction. However, according to the present embodiment, the air bag 122 can be stably and reliably protruded toward the driver-protection area 130. In particular, since the second component portion 124 is mounted over a wide range along the longitudinal direction of the long-length handlebar 104, this effect is further enhanced.

In the present embodiment, since the second component portion 124 of the air bag 122 is disposed outside the retainer 128, the time required to accomplish the deployment and inflation of the entire air bag 122 can be reduced and the property of restraining the driver is improved. Furthermore, the above-described configuration can miniaturize the retainer 128. In particular, with respect to the vehicle body of the two-wheeled motor vehicle 100 wherein the driver is exposed in all directions, generally, the holder is upsized in order to reliably restrain the driver by using a larger air bag. However, according to the present embodiment, the retainer 128 that serves as a holder can be miniaturized while ensuring the property of restraining the driver with the air bag 122. In this manner, the external appearance can be effectively improved with respect to the two-wheeled motor vehicle 100 equipped with the air bag device 120. That is, with respect to the vehicle body, particularly the two-wheeled motor vehicle 100, wherein the driver is exposed in all directions, although the holder is generally upsized because a large air bag must be used, the above-described problem can be overcome according to the present embodiment.

Since the present embodiment has a configuration in which the second component portion 124 is mounted on the handlebar 104 with mounting hardware 125, shifting of the location of the air bag 122 after completion of the deployment and inflation is unlikely to occur during restraint of the driver. In addition, the handlebar 104 having rigidity serves as a pressure-receiving portion of this air bag 122 and, thereby, a load applied from the driver to the air bag 122 can be reliably received by the handlebar 104.

The present invention is not limited to only the above-described embodiment, and various applications and modifications are included. For example, each of the following variations may be carried out as an application of the above-described embodiment.

In the above-described embodiment, the second component portion 124 of the air bag 122 is mounted on the handlebar 104. However, in terms of the configuration, the second component portion 124 may be mounted on a vehicle body-side component other than the handlebar 104. For example, the second component portion 124 may be mounted on the panel 105, which is one of the vehicle body-side components, or its surroundings.

In the above-described embodiment, the periphery of the second component portion 124 is covered with the protective cloth 127, and both this second component portion 124 and the handlebar 104 are covered with the cover 126. However, the protective cloth 127 and the cover 126 may not be provided. In terms of the configuration, alternatively, a part of the second component portion 124 may be covered with the protective cloth 127 or the cover 126. The protective cloth 127 and the cover 126 may constitute one component.

Figure 9:
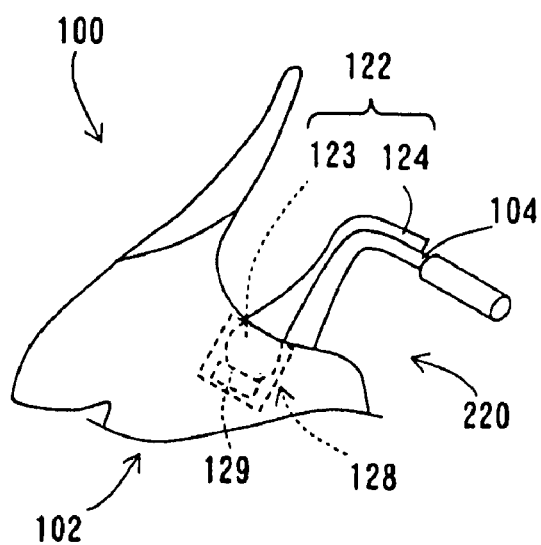
FIG. 9 is a diagram showing the configuration of the air bag device 220 according to another embodiment.
Figure 10:
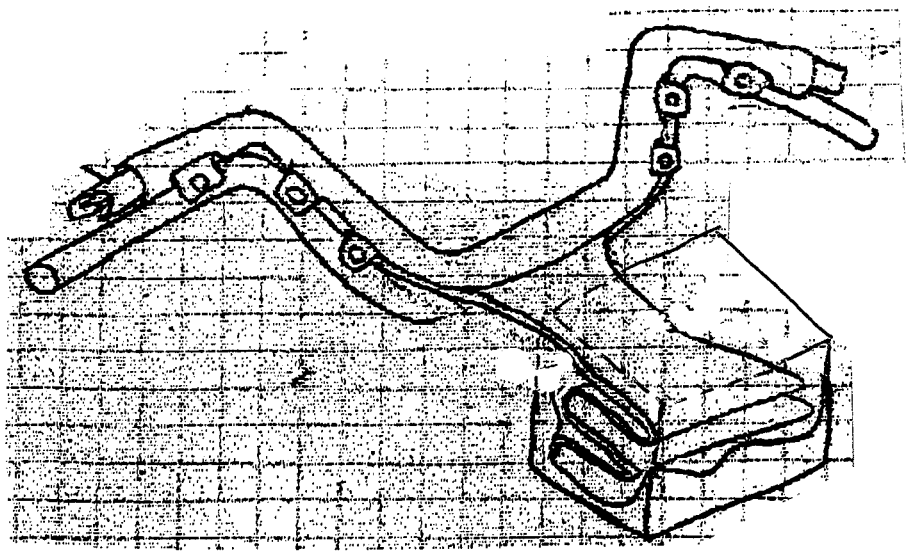
FIG. 10 is a schematic view showing a folded first portion of the airbag stored in the retainer and a differently folded second portion of the airbag drawn out of the airbag and mounted to the handlebar.

In the above-described embodiment, the second component portion 124 is mounted on the top face portion of the handlebar 104. However, an air bag device 220 having a configuration in which the second component portion 124 is mounted on the handlebar 104 while the location of the mounting is in the side forward region of the vehicle body, as shown in FIG. 9, may be used. According to such a disposition of the second component portion 124, there are reduced obstructions which hinder the deployment and inflation of the air bag 122 and, therefore, the air bag 122 deploys and inflates more smoothly. In FIG. 9, the same elements as those shown in FIG. 2 are indicated by the same reference numerals.

In the above-described embodiment, the second component portion 124 constituting a part of the air bag 122 is disposed outside the retainer 128 in advance. However, in the configuration, the entire air bag 122 including this second component portion 124 and the first component portion 123 may be disposed outside the retainer 128 in advance. In this case, the size of the retainer 128 can be controlled to a size corresponding to the inflator 129 and, therefore, the retainer 128 can be further miniaturized.

In the above-described embodiment, the scooter-type two-wheeled motor vehicle 100 is explained. However, the present invention may also be applied to other types of motorbikes.

According to the present invention, with respect to motorbikes, the construction technology of an air bag, which contributes to adequate protection of the driver in an accident, and related technologies are provided.

What is claimed is:

1. An air bag device for a motorbike, the air bag device comprising:
    an air bag configured for being deployed and inflated in the event of a motorbike frontal collision;
    a holder having an interior space;
    a portion of the air bag adapted and configured for being mounted to the motorbike outside the interior space of the holder to minimize interference with the motorbike as the air bag is deployed and inflated; and
    an intermediate portion of the airbag extending outside the interior space of the holder and between the holder and the airbag portion configured for being mounted to the motorbike so that the intermediate portion is exposed along the motorbike.

2. The air bag device of claim 1 wherein the air bag includes another portion that is contained in the holder that is inflated prior to the portion configured for being mounted outside the holder upon air bag deployment.

3. The air bag device of claim 1 wherein the air bag includes another portion that is contained in the holder, with the air bag portions being folded differently from each other.

4. The air bag device of claim 1 wherein the air bag portion is folded to have a generally elongate configuration extending across the motorbike to substantially ensure air bag deployment and inflation in an area adjacent thereto.

5. The air bag device of claim 1 wherein the air bag portion includes a cover separate and spaced from the holder that opens upon air bag deployment.

6. The air bag device of claim 5 wherein the cover includes a protective cloth and a cover member having a frangible portion thereof.

7. The air bag device of claim 5 wherein the airbag portion is configured for being mounted to a handle bar of a motorbike, and the cover is configured to generally match the handlebar to which the air bag portion is mounted.

8. The air bag device of claim 1 wherein the holder is sized and configured to contain another portion of the air bag with the air bag portion outside the retainer allowing the holder to be minimized in size.

9. The air bag device of claim 1 in combination with the motorbike with the motorbike including a handlebar to which the air bag portion is mounted.

10. The airbag device of claim 1 wherein the airbag portion configured for being mounted to the motorbike has a longer width extending across the motorbike than the exposed intermediate portion of the airbag.

11. The airbag device of claim 1 including an inflator in the interior space of the holder.

12. An air bag device for a motorbike, the air bag device comprising:
    an air bag configured for being deployed and inflated in the event of a motorbike frontal collision;
    a holder for the air bag;
    a portion of the air bag adapted and configured for being mounted to the motorbike outside the holder to minimize interference with the motorbike as the air bag is deployed and inflated; and
    fasteners for securing the air bag portion to the motorbike to minimize shifting thereof with impact of the driver thereagainst.

13. A motorbike including an air bag device, the motorbike comprising:
    a body including a handlebar;
    a seat for a driver;
    an air bag for being deployed and inflated in a predetermined driver protection area forwardly of the seat in the event of a motorbike frontal collision;
    a retainer having an interior space for storing at least a first portion of the air bag therein; and
    a second portion of the air bag disposed outside the retainer interior space that is mountable to the handlebar generally adjacent the driver protection area so as to be reliably deployed and inflated therein.

14. The motorbike of claim 13 wherein the handlebar has an elongate configuration with the airbag portion mounted to extend therealong.

15. A motorbike including an air bag device, the motorbike comprising:
    a body;
    a seat for a driver;
    an air bag for being deployed and inflated in a predetermined driver protection area forwardly of the seat in the event of a motorbike frontal collision;
    a retainer for the air bag; and
    a portion of the air bag disposed outside the retainer that is mountable to the body generally adjacent the driver protection area so as to be reliably deployed and inflated therein;
    wherein the body includes a handlebar to which the air bag portion is mounted so that interference therewith upon air bag deployment and inflation is kept to a minimum, and the handlebar includes a top surface portion with the air bag portion mounted to the handlebar top surface portion.

16. A motorbike including an air bag device, the motorbike comprising:
    a body;
    a seat for a driver;
    an air bag for being deployed and inflated in a predetermined driver protection area forwardly of the seat in the event of a motorbike frontal collision;
    a retainer for the air bag; and
    a portion of the air bag disposed outside the retainer that is mountable to the body generally adjacent the driver protection area so as to be reliably deployed and inflated therein,
    wherein the retainer is sized to store the entire air bag therein with the air bag portion drawn out therefrom for mounting to the body.

17. The motorbike of claim 13 wherein the retainer is sized to contain the first portion of the air bag therein with the air bag second portion to be mounted to the handlebar remaining outside the retainer to allow the retainer to be minimized in size.

18. The motorbike of claim 13 wherein the airbag includes an intermediate portion extending between the first and second portions of the airbag and being exposed along the motorbike body.

19. The motorbike of claim 18 wherein the second portion of the airbag has a longer width extending across the body than the intermediate portion of the airbag.

20. The motorbike of claim 13 including an inflator in the interior space of the retainer.

* * * * *